Oct. 7, 1958
H. J. KAYE
2,854,888
ROTARY TURRET FOR POWER DRIVEN MAGAZINE
HANDLING SLIDE PROJECTOR
Filed June 14, 1954
3 Sheets—Sheet 1
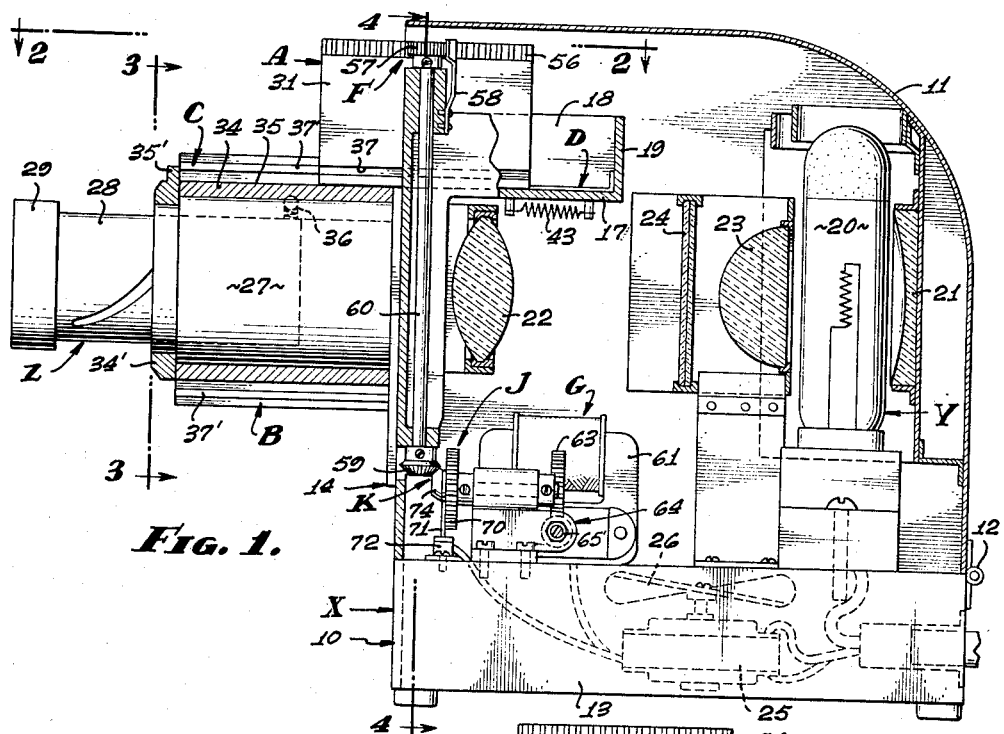
INVENTOR.
HAROLD J. KAYE
BY
Wm. H. Maxwell Jr.
AGENT.

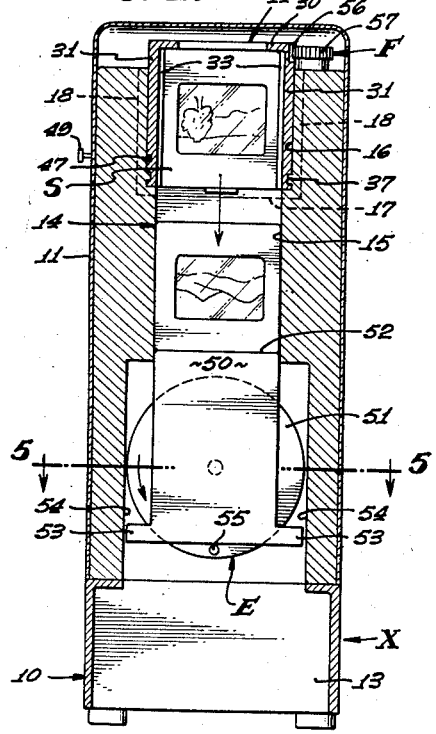

Oct. 7, 1958 H. J. KAYE 2,854,888
ROTARY TURRET FOR POWER DRIVEN MAGAZINE
HANDLING SLIDE PROJECTOR
Filed June 14, 1954 3 Sheets-Sheet 3
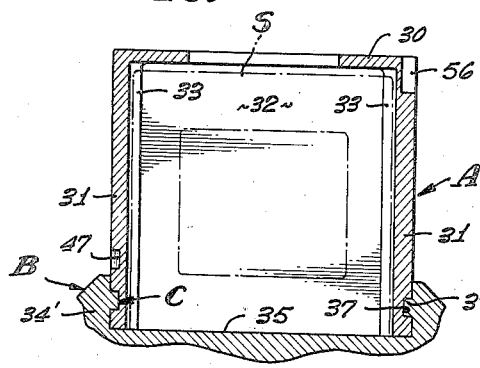
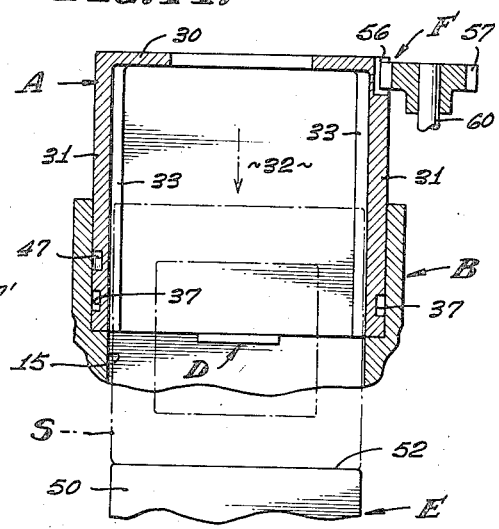
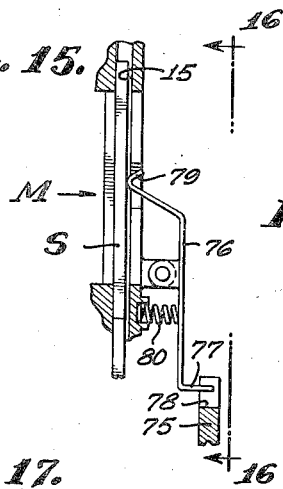
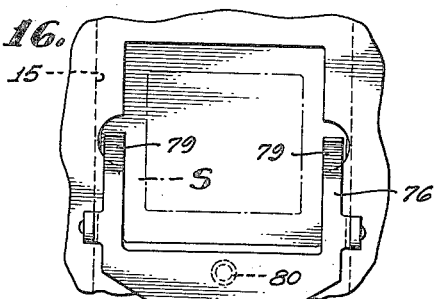
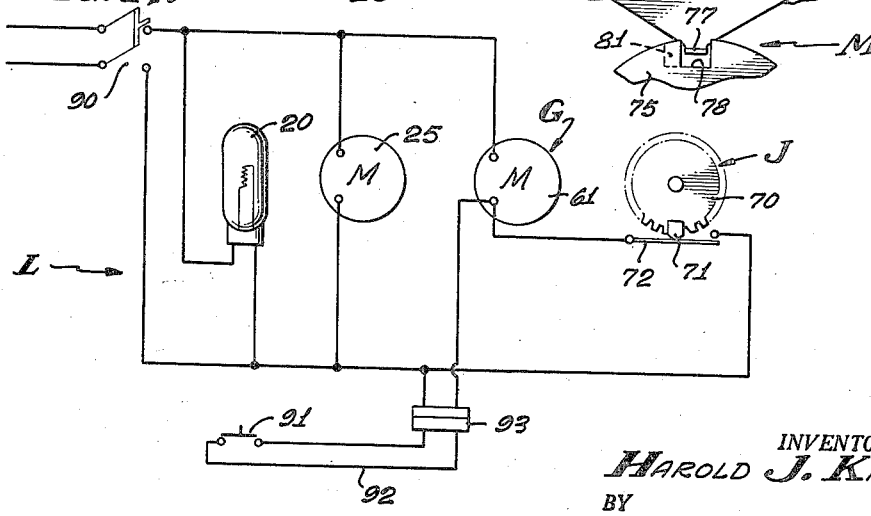
INVENTOR.
HAROLD J. KAYE
BY
W. H. Maxwell Jr.
AGENT.

United States Patent Office

2,854,888
Patented Oct. 7, 1958

2,854,888

ROTARY TURRET FOR POWER DRIVEN MAGAZINE HANDLING SLIDE PROJECTOR

Harold J. Kaye, Los Angeles, Calif.

Application June 14, 1954, Serial No. 436,520

16 Claims. (Cl. 88—28)

This invention relates to a power driven slide projector and is more particularly concerned with a rotary turret magazine carrier which handles a plurality of slides to be shown individually and one after the other by the projector. With the present invention a plurality of slides or transparencies can be carried in each magazine employed, and one or more magazines can be applied to the rotary turret at a time.

It is a general object of this invention to provide a projecting machine of the character referred to which will continuously show slides by successively extracting them from and replacing them in magazines which can be easily and quickly applied to the projector several at a time. It is absolutely unnecessary for the slides to be handled once they have been placed in the magazine.

Slide projectors in common use today are of varying designs and constructions, some of them requiring hand manipulation of the slides and others being so-called automatic or semi-automatic machines. That is, the slides are applied to the machine in limited numbers and are mechanically handled and shown thereby. In practice, it has been found that automatic slide projectors are not altogether satisfactory, and in many instances require special attention from the operator since it is common for them to jam and otherwise become inoperative during showing of the slides.

It is also an object of this invention to provide a power driven slide projector of the character referred to which cannot be tampered with during the operation thereof, so that the slides handled thereby are treated in a definite predetermined manner. With the projector that I have provided, the magazines which are open at the top thereof are inverted so that the slides are acted upon by gravity to be lowered into projecting position.

It is also an object of this invention to provide means for supporting the slides when the magazine is inverted until the magazine is in proper operating position and which means automatically operates to release the slides so that they may fall by gravity into a slide handling passage.

It is also an object of this invention to provide a slide or transparency projector which is adapted to handle the slides in a most effective manner without damaging them in any way. That is, the slides are not frictionally engaged by pressure springs or like devices which are commonly employed in projectors, which springs and the like ordinarily abrade the surfaces of the slides to cause them to become worn and eventually useless.

It is still another object of this invention to provide a magazine which is particularly adapted to store transparencies or slides and which is also adapted to be used in connection with the projector so that a person operating the projector does not have to manually engage the individual slides. In fact, once the slides have been arranged in their desired order the slides are returned to the magazine in that order and require no further handling.

The various objects and features of my invention will be fully understood from the following detailed description of a typical preferred form and application of my invention, throughout which description reference is made to the accompanying drawings, in which:

Fig. 1 is a side elevation view of the projector that I have provided showing portions thereof in section. Fig. 2 is a plan sectional view taken as indicated by line 2—2 on Fig. 1. Fig. 3 is a transverse sectional view taken as indicated by line 3—3 on Fig. 1. Fig. 4 is a transverse sectional view taken as indicated by line 4—4 on Fig. 1. Fig. 5 is a plan section taken as indicated by line 5—5 on Fig. 4. Figs. 6 to 9, inclusive, are diagrammatic views of the gearing employed in the structure taken generally as indicated by lines 6—6, 7—7, 8—8 and 9—9 on Fig. 5. Fig. 10 is a detailed sectional view of the upper portion of the structure. Fig. 11 is an enlarged detailed sectional view taken as indicated by line 11—11 on Fig. 10. Fig. 12 is an enlarged detailed sectional view taken as indicated by line 12—12 on Fig. 11. Fig. 13 is a detailed sectional view showing the magazine attached to the carrier that I have provided. Fig. 14 is a detailed sectional view showing how the slide leaves and returns to the magazine. Fig. 15 is an enlarged detailed sectional view of a portion of the slide handling mechanism. Fig. 16 is a sectional view taken as indicated by line 16—16 on Fig. 15, and Fig. 17 is a diagram illustrating the manner in which the elements of the projector are electrically connected.

The projector that I have provided is a slide projector and is adapted particularly to handle transparencies, say for example, two inch by two inch transparencies, and as shown throughout the drawings is a power driven apparatus adapted to handle a multiplicity of slides at one time. In accordance with the present invention the power driven slide projector that I have provided is particularly adapted to handle slides which are carried in containers or magazines.

The structure of the present invention involves, generally, a body X, a light source Y and a projecting lens Z. The body X has a frame 10 which carries the elements of the projector and a cover 11 which houses the elements of the projector. The cover 11 may be any suitable cover and, as shown in the drawings, is a simple shell of sheet metal construction or the like, hinged to the frame at 12 so that it can be opened away from the mechanism hereinafter described. The frame 10 has a horizontally disposed elongate base portion 13 and a vertically disposed magazine and slide handling means 14. The magazine and slide handling means 14 is located at the forward end of the projector and is characterized by a vertically disposed slide receiving passage 15 opening near the top of the means 14 and a magazine handling receiver 16. The slide handling passage extends vertically within the means 14 and is adapted to freely pass the slides as they are handled by the structure. The magazine handling receiver 16 is located adjacent the upper end of the passage 15 and is horizontally disposed and has a bottom 17, sides 18 and a back 19. The receiver 16 is shaped and proportioned to slidably receive and guide the magazine hereinafter described.

The light source Y may be of any suitable type and, as shown in the drawings, is a typical source of condensed light and includes an incandescent lamp 20, a reflector 21, condensing lenses 22 and 23 and suitable filters 24.

The light source also includes a cooling means in the form of an electrical motor 25 which drives a fan 26. The elements 20 to 24, inclusive, of the light source Y are suitably spaced along a common horizontal axis as clearly illustrated in Fig. 1 of the drawings, so that a beam of light is directed forwardly and horizontally. The motor 25 and fan 26 are preferably vertically disposed so that air is circulated from the bottom of the body X and through the light source elements, with the result that heat generated by the light source is absorbed and carried away by the movement of air through the body X.

The projecting lens Z may be any suitable lens and, as common in projectors of the type under consideration, involves a mount 27, an adjusting barrel 28 carrying a lens unit 29. The barrel 28 and unit 29 may be of ordinary construction, whereas the mount 27 not only slidably receives the barrel 28 but is provided with a smooth cylindrical outer surface which is adapted to rotatably receive the magazine carrier hereinafter described. As shown, the lens mount 27 is rigidly carried by the forward portion of the frame 10 coincidental with the axis of the light source Y.

The power driven projector that I have provided includes, generally, one or more removable magazines A preferably a plurality thereof, a magazine carrier B adapted to receive and position the magazines so that the slides are positioned adjacent the passage 15, means C securing the magazines to the carrier, means D selectively closing the slide handling means above referred to, a slide shifting means E, a magazine advancing means F, a drive G adapted to power the mechanism that I have provided, an intermittent control H for the slide shifting means E, a stop control J adapted to stop the drive G, an intermittent control K for the magazine advancing means F, an electrical control circuit L, and a slide positioning means M.

The magazines A are simple box-like elements, one or more of the magazines being handled by the projector at one time and each involves a bottom wall 30, side walls 31 and end walls 32. The top of the magazine is open and a plurality of slides S or transparencies are carried in the magazine in spaced relationship by means of suitable spacers or ribs 33.

The magazine carrier B is a rotary turret magazine carrier and involves a sleeve 34 that is rotatably carried at the forward end of the projector adjacent the means 14. As clearly illustrated in Figs. 1 and 3 of the drawings, the carrier B is a shiftable element that is rotatably carried on the cylindrical outer wall of the mount 27. The sleeve 34 has one or more faces 35 adapted to receive the magazines A and, as shown in Fig. 3 of the drawings, there may be several faces 35 each cooperating with a magazine. A retainer 34' secures the sleeve 34 on the mount and a stop 35' projects above the uppermost face 35 to prevent the uppermost magazine from forward movement. A spring detent 36 accurately positions the carrier B so that each of the faces 35 can be moved into alignment with the receiver 16.

The means C for securing the magazine A to the carrier B may vary as circumstances require and as illustrated involves simple channels 37 and rails 37'. The channels 37 are provided in the side walls 31 of the magazines and the rails are spaced parallel elongate parts which are carried adjacent the side edges of the faces 35. When it is desired to place a magazine on the carrier B it is merely necessary to slide the channels onto the rails so that the magazine A is coupled to the carrier and cannot become displaced therefrom. It is to be noticed that the channels in the magazines are at the upper portion thereof so that the open top of the magazines are brought into engagement with the faces 35 of the carrier B, with the result that the slides or transparencies are retained in the magazines and will not fall therefrom when the magazines are inverted as shown in Fig. 13 of the drawings.

The means D for selectively closing the slide handling means is provided so that when the magazine is initially inserted into the receiver 16 in the means 14, the individual slides will not drop by gravity into the slide handling passage 15. In the preferred form of the invention, the magazine A is initially moved by manual operation to the extreme rear end of the receiver 16, and therefore the means D is provided to prevent the slides from dropping into the passage 15 as this operation takes place. The means D involves, generally, a closure 38, a latch 39 and a release mechanism 40.

As shown in Fig. 10 of the drawings, the closure is a flat elongate part carried in a channel 41 in the bottom 17 of the magazine handling means, and when in a forward position has a forward end portion 42 thereof which overlies and closes the upper end of the passage 15. A suitable spring 43 or the like, normally yieldingly holds the closure in a forward position. An abutment 44 projects upwardly from the rear end of the closure 38 so that when a magazine A engages therewith the closure 38 is moved rearwardly so that the passage 15 is opened. It will be readily understood that the magazine is completely inserted into the magazine handling means so that all of the slides are supported by the bottom 17.

The latch 39 involves a simple spring pressed bolt 45 which engages in a notch 46 in the closure 38 so that when the closure is moved rearwardly it is held in that position by the bolt 45.

The release mechanism 40 involves an elongate channel 47 in one side of the magazine A which extends partially or substantially the length thereof, leaving a lug portion 48 which engages the bolt 45 so that the bolt is retracted from the notch 46 as the magazine leaves the receiver 16. A suitable manually operated draw bar 49 may be provided so that the closure can be released whenever desired. It will be readily understood how the closure prevents entry of the slides into the passage 15 as the magazine is moved into initial operating position and how the closure is released from the open position when the magazine leaves the recess 16.

The slide shifting means provided by the present invention is adapted to receive the slides individually by gravity from the magazine A and to return them to the magazine A after they have been shown by the projector. The means E involves, generally, a slide shifter 50 or lifter and an operator 51 for the shifter. As clearly illustrated in Fig. 4 of the drawings, the slide lifter is a simple rectangular shaped elongate element which is shiftable vertically in the passage 15 between upper and lower positions. When the lifter is in the upper position the top 52 thereof is coincidental with the top face of the bottom 17, and with the faces 35, and when it is in the lower position the slide to be shown by the projector is lowered and held in alignment with the axis of the light source Y and projecting lens Z.

The lower end of the lifter 50 is provided with guides 53 which operate in a vertical passageway 54. The passageway 54 is of greater transverse extent than the passage 15 and the guides 53 prevent the lifter from being extracted or removed from the passage. The operator 51 for the lifter 50 may be a disc-shaped element and involves a lifting pin 55 carried near the periphery of the disc-shaped element. When in the lower position the lifting pin 55 is as shown in Fig. 4 of the drawings, and it will be readily understood that as the operator 51 moves through one complete turning cycle or revolution the lifter will be moved to an upper position and back to a lower position.

The magazine advancing means F that I have provided operates to move the magazines A forwardly one position at a time so that a single slide can be withdrawn from the magazine at a time and then returned thereto before the next slide is withdrawn from the magazine and returned thereto, etc. The means F involves a rack and pinion drive and as clearly illustrated throughout the drawings, there is a rack 56 at one side of each magazine and a drive pinion 57 carried by the frame 10 which operatively engages and drives the rack. A spring detent 58 is engaged with the pinion to position the rack so that the slides handled by the magazine are positioned in proper register with the passage 15. The pinion 57 is driven by a pinion 59 through a shaft 60 which is operated as hereinafter described, so that the drive pinion 57 is intermittently operated one step at a time.

The drive G that powers the projector of the present invention involves a simple electric motor 61, a worm gear 62 and a worm wheel 63. The motor 61 is energized through an electrical circuit and when in operation drives the worm gear 62 so that the worm wheel 63 is operated in a counterclockwise direction as indicated in Fig. 6 of the drawings. The drive G further includes a friction control 64 which includes a spring loaded ball 65 that has pressure engagement with the end of the shaft which projects from the motor 61 and drives the worm gear 62. A suitable adjusting screw and lock nut 65' may be provided to adjust the friction generated by the control 64.

The intermittent control H for the slide shifting means acts to reciprocate the slide shifter 50 between the upper and lower position in the passage 15 and includes a pair of transfer gears 66 and 66' engaged with the operator 51, which gears 66 and 66' are carried on spaced parallel axes. Gear 66' operates in a clockwise direction. The intermittent control H also includes a driving gear 67 and a driven gear 68 that operates the gear 66'. The gears 67 and 68 are of equal pitch and diameter. For example, the gears 67 and 68 may be thirty-two pitch gears. The driven gear 66, as shown in Fig. 8 of the drawings, has teeth in a complete series around the circumference thereof, whereas the driving gear 66' is provided with teeth throughout 180° thereof, that is, the gear 67 is segmental and has but nine teeth, whereas the gear 68 is a complete gear with eighteen teeth. It will be readily understood how the gear 67 in driving the gear 68 will impart an intermittent motion to the gear 68. As illustrated in Fig. 5 of the drawings, the gear 66 is carried on a pilot member 69 which projects forwardly from the shaft which drives the gear 67.

The stop control J that I have provided is to open the electrical circuit to the motor 61 above referred to, when a slide has reached the lower projecting position shown in Fig. 4 of the drawings. The control J involves a reduction gear 70 driven by the gear 66' in a counterclockwise direction and a cam 71 that operates a switch 72. As shown in Fig. 8 of the drawings, the switch 72 is operated when the cam 71 is in the lowermost position. Through this relationship of parts and elements a slide is returned to the magazine A by the lifter 50 whereupon the magazine can then be advanced after which the lifter is lowered to show the next slide. The switch 72 is a normally closed switch and is in series with the motor 61 so that the motor remains in operation until the switch 72 is opened by means of the cam 71. In the preferred form of the invention the switch 72 is provided with an inclined contact so that the cam 71 is frictionally stopped in the position shown in Fig. 8.

The intermittent control K for the magazine advancing means F is driven through the reduction gear 70 and involves, generally, the driven pinion 59 and a drive pinion 74 carried on the shaft which carries the reduction gear 70. The pinion 59 and pinion 74 are preferably miter gears or bevel gears and, in practice, may be twenty pitch gears of the same diameter. As shown in the drawings, the gear 59 has a complete set of teeth about the circumference thereof, that is, it may have eight teeth whereas the gear 74 has but one tooth. Through this relationship of teeth the gear 59 is driven one-eighth of a turn for every revolution of the drive pinion 74. In practice, the spacing of the slides in the magazine A corresponds to the spacing of the teeth of the rack 56 and pinions 57, 59 and 74.

The slide positioning means of the present invention is provided to accurately position the slides handled by the projector so that the successive slides are placed in the same focal plane. The slide positioning means M involves a simple cam 75 driven by the intermittent control means H and a presser 76 controlled by the cam. As shown in Figs. 15 and 16 of the drawings, when the mechanism of the present invention is positioned with the slide in the showing position a follower 77 on the presser 76 drops into an opening 78 in the cam and presser feet 79 engage the back face of the slide forcing it against the forward wall of the passage 15. A suitable spring 80 or the like, yieldingly urges the presser 76 into engagement with the slide and into the notch 78. When the cam 75 operates the follower 77 is guided out of the notch 78 by means of an inclined face 81 adjacent the notch and the follower 77 rides on the face of the cam until it again drops into the notch 78.

The control circuit L that I have provided includes a main switch 90 that controls the operation of the lamp 20 and motor 25 of the cooling means and also controls the motor 61. The motor 61 is in series with the switch 90 and with the switch 72 so that when the switch 90 is closed the motor 61 will operate until the switch 72 is opened by means of the cam 71 of the stop control J. In order to start the motor 61 for another cycle of operation, a starting switch 91 is provided which is manually closed momentarily by the operator so that the drive G commences to operate to close the switch 72, whereupon the device operates until a complete cycle of operation has been completed. As indicated in Figs. 1 and 17 of the drawings, the switch 91 is in a circuit carried by an extension cord 92 which is connected to the structure of the projector through an electrical connector 93. With this arrangement of elements the operator of the projector is able to control the action of the projector from any remote point.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A magazine handling slide projector of the character described, including, a body with a frame having a horizontally disposed magazine handling receiver, a lens mount adjacent the receiver, and a magazine carrier rotatably supported by the mount and adapted to carry a magazine and support it in alignment with and so that it is shiftable into supporting engagement with the receiver.

2. A magazine handling slide projector of the character described, including, a body with a frame having a horizontally disposed magazine handling receiver, a lens mount adjacent the receiver, and a magazine carrier rotatably supported by the mount and having a plurality of magazine receiving faces each adapted to carry a magazine and support it in alignment with and so that it is shiftable into supporting engagement with the receiver.

3. A magazine handling slide projector of the character described, including, a body with a frame having horizontally disposed magazine handling receiver, a lens mount adjacent the receiver, and a magazine carrier rotatably supported by the mount, spaced parallel rails on the carrier, there being channels in the magazine engageable with the rails to shiftably carry a magazine and support it in alignment with and so that it is shiftable into supporting engagement with the receiver.

4. A magazine handling slide projector of the character described, including, a body with a frame having a horizontally disposed magazine handling receiver, a lens mount adjacent the receiver, and a magazine carrier rotatably supported by the mount and having a plurality of magazine receiving faces, spaced parallel rails at each face, there being channels in the magazines engageable with rails to shiftably carry a magazine and support it in alignment with and so that it is shiftable into supporting engagement with the receiver.

5. A magazine handling slide projector of the character described, including, a body with a frame having a horizontally disposed magazine handling receiver, a lens mount adjacent the receiver, and a magazine carrier rotatably supported by the mount and adapted to carry a magazine and support it in alignment with and so that it is shiftable into supporting engagement with the receiver, there being a stop fixed on the mount to limit forward movement of the magazine when the magazine is in alignment therewith and with the receiver.

6. A magazine handling slide projector of the character described, including, a body with a frame having a horizontally disposed magazine handling receiver, a lens mount adjacent the receiver, and a magazine carrier rotatably supported by the mount and having a plurality of magazine receiving faces each adapted to carry a magazine and support it in alignment with and so that it is shiftable into supporting engagement with the receiver, there being a stop fixed on the mount to limit forward movement of the magazines when the magazine is in alignment therewith and with the receiver.

7. A magazine handling slide projector of the character described, including, a body with a frame having a horizontally disposed magazine handling receiver, a lens mount adjacent the receiver, a magazine carrier rotatably supported by the mount and adapted to carry a magazine, and a spring biased detent engaging and positioning the carrier to support the magazine in alignment with and so that it is shiftable into supporting engagement with the receiver.

8. A magazine handling slide projector of the character described, including, a body with a frame having a horizontally disposed magazine handling receiver, a lens mount adjacent the receiver, a magazine carrier rotatably supported by the mount and having a plurality of magazine receiving faces each adapted to carry a magazine, and a spring biased detent engaging and positioning the faces of the carrier to support the magazines in alignment with and so that it is shiftable into supporting engagement with the receiver.

9. A magazine handling slide projector of the character described, including, a body with a frame having a horizontally disposed magazine handling receiver with a flat bottom, a lens mount adjacent the receiver, and a magazine carrier rotatably supported by the mount and having a face adapted to carry a magazine, said face being shiftable into a plane coincidental with the plane of the bottom of the receiver to support the magazine in alignment with and so that it is shiftable into supporting engagement with the receiver.

10. A magazine handling slide projector of the character described, including, a body with a frame having a horizontally disposed magazine handling receiver with a flat bottom, a lens mount adjacent the receiver, and a magazine carrier rotatably supported by the mount and having a plurality of faces each adapted to carry magazines, said faces being shiftable into a plane coincidental with the plane of the bottom of the receiver to support the magazine in alignment with and so that it is shiftable into supporting engagement with the receiver.

11. A magazine handling slide projector of the character described, including, a body with a frame having a horizontally disposed magazine handling receiver with a flat bottom and having a vertically disposed slide handling passage opening into the receiver at the bottom thereof, a lens mount adjacent the receiver, and a magazine carrier rotatably supported by the mount and having a face adapted to carry a magazine, said face being shiftable into a plane coincidental with the plane of the bottom of the receiver to support the magazine in alignment with and so that it is shiftable into supporting engagement with the receiver and with the slides positioned to enter said passage.

12. A magazine handling slide projector of the character described, including, a body with a frame having a horizontally disposed magazine handling receiver with a flat bottom and having a vertically disposed slide handling passage opening into the receiver at the bottom thereof, a lens mount adjacent the receiver, a magazine carrier rotatably supported by the mount and having a face adapted to carry a magazine, said face being shiftable into a plane coincidental with the plane of the bottom of the receiver to support the magazine in alignment with and so that it is shiftable into supporting engagement with the receiver and with the slides positioned to enter said passage, and means for opening and closing the slide handling passage.

13. A magazine handling slide projector of the character described, including, a body with a frame having a horizontally disposed magazine handling receiver with a flat bottom and having a vertically disposed slide handling passage opening into the receiver at the bottom thereof, a lens mount adjacent the receiver, a magazine carrier rotatably supported by the mount and having a face adapted to carry a magazine, said face being shiftable into a plane coincidental with the plane of the bottom of the receiver to support the magazine in alignment with and so that it is shiftable into supporting engagement with the receiver, and means for opening and closing the slide handling passage and including a shiftable closure carried in the plane of the bottom of the receiver.

14. A magazine handling slide projector of the character described, including, a body with a frame having a horizontally disposed magazine handling receiver with a flat bottom and having a vertically disposed slide handling passage opening into the receiver at the bottom thereof, a lens mount adjacent the receiver, a magazine carrier rotatably supported by the mount and having a face adapted to carry a magazine, said face being shiftable into a plane coincidental with the plane of the bottom of the receiver to support the magazine in alignment with and so that it is shiftable into supporting engagement with the receiver, and means for opening and closing the slide handling passage and including, a shiftable closure carried in the plane of the bottom of the receiver, and an abutment on the closure and engageable with the magazine to open the passage.

15. A magazine handling slide projector of the character described, including, a body with a frame having a horizontally disposed magazine handling receiver with a flat bottom and having a vertically disposed slide handling passage opening into the receiver at the bottom thereof, a lens mount adjacent the receiver, a magazine carrier rotatably supported by the mount and having a face adapted to carry a magazine, said face being shiftable into a plane coincidental with the plane of the bottom of the receiver to support the magazine in alignment with and so that it is shiftable into supporting engagement with the receiver, and means for opening and closing the slide handling passage and including, a shiftable closure carried in the plane of the bottom of the receiver, an abutment on the closure and engageable with the magazine to open the passage, a spring normally urging the closure to close the passage, and a latch for releasably holding the closure open.

16. A magazine handling slide projector of the character described, including, a body with a frame, having a horizontally disposed magazine handling receiver with a flat bottom and having a vertically disposed slide handling passage opening into the receiver at the bottom thereof, a lens mount adjacent the receiver, a magazine carrier rotatably supported by the mount and having a face adapted to carry a magazine, said face being shiftable into a plane coincidental with the plane of the bottom of the receiver to support the magazine in alignment with and so that it is shiftable into supporting engagement with the receiver, and means for opening and closing the slide handling passage and including, a shiftable closure carried in the plane of the bottom of the receiver, an abutment on the closure and engageable with the magazine to open the passage, a spring normally urging the closure to close the passage, a latch for releasably holding the closure open, and a release operated by the magazine to operate the latch for releasing the closure.

References Cited in the file of this patent

UNITED STATES PATENTS

| | | |
|---|---|---|
| 256,966 | Brown | Apr. 25, 1882 |
| 462,842 | Hurlbut | Nov. 10, 1891 |
| 1,240,593 | Palmer | Sept. 18, 1917 |
| 1,388,193 | Palmer | Aug. 23, 1921 |
| 1,402,791 | Petherick | June 10, 1922 |
| 2,401,506 | Pechkranz | June 4, 1946 |